US012658455B2

(12) United States Patent
Xiang et al.

(10) Patent No.: US 12,658,455 B2
(45) Date of Patent: Jun. 16, 2026

(54) METHOD FOR PREPARING A SUBMICRO/NANO-POROUS NIO/APATITE-TYPE LANTHANUM SILICATE ANODE FUNCTIONAL LAYER

(71) Applicant: DALIAN UNIVERSITY OF TECHNOLOGY, Dalian (CN)

(72) Inventors: Li Xiang, Dalian (CN); Yuhang Wei, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 532 days.

(21) Appl. No.: 18/268,495

(22) PCT Filed: Jan. 11, 2022

(86) PCT No.: PCT/CN2022/071153
§ 371 (c)(1),
(2) Date: Jun. 20, 2023

(87) PCT Pub. No.: WO2022/152093
PCT Pub. Date: Jul. 21, 2022

(65) Prior Publication Data
US 2024/0039003 A1     Feb. 1, 2024

(30) Foreign Application Priority Data

Jan. 17, 2021   (CN) ......................... 202110058873.8

(51) Int. Cl.
*H01M 4/86* (2006.01)
*H01M 4/88* (2006.01)
*H01M 8/12* (2016.01)

(52) U.S. Cl.
CPC ....... *H01M 4/8657* (2013.01); *H01M 4/8835* (2013.01); *H01M 4/8605* (2013.01); *H01M 2008/1293* (2013.01)

(58) Field of Classification Search
None
See application file for complete search history.

(56) References Cited

U.S. PATENT DOCUMENTS 6,653,009 B2 *   11/2003   Wang .................. H01M 8/1226
                                                                    427/115
10,483,580 B2 *  11/2019   Wang .................. H01M 8/1246
(Continued)

FOREIGN PATENT DOCUMENTS

CN          112751041 A      5/2021
JP          2011165424 A     8/2011

OTHER PUBLICATIONS

Yang et al., "A new family of Cu-doped lanthanum silicate apatites as electroyte materials for SOFCs: Synthesis, structural and electronic properties," Journal of the European Ceramic Society 39 (2019) pp. 424-431, 8 pages.

(Continued)

*Primary Examiner* — Kevin M Bernatz
(74) *Attorney, Agent, or Firm* — Muncy, Geissler, Olds & Lowe, P.C.

(57) ABSTRACT

This invention relates to a method for preparing of a submicro/nano-porous NiO/apatite-type lanthanum silicate anode functional layer. In the method a functional layer nanopowder, ethyl cellulose and terpineol are added into a rotary evaporation bottle containing anhydrous ethanol, and a suspension obtained after mixing is dispersed ultrasonically. The anhydrous ethanol in the suspension is removed by a rotary evaporator. When the suspension becomes a viscous paste, the paste is taken out and ground to complete the preparation of a functional layer paste. The functional layer paste is applied onto an anode substrate by screen printing, and 3 sublayers are screen printed. After dried, the sublayers are heat treated and sintered. The heating rate, the (Continued)

cooling rate and the holding time are controlled in the heating and cooling processes to complete the preparation of the anode functional layer.

10 Claims, 2 Drawing Sheets

(56) References Cited

U.S. PATENT DOCUMENTS

| | | | | |
|---|---|---|---|---|
| 10,727,493 | B2 * | 7/2020 | Ide | H01B 1/06 |
| 2007/0077476 | A1 * | 4/2007 | Lee | H01M 4/8885 |
| | | | | 264/618 |
| 2021/0036354 | A1 * | 2/2021 | Ide | H01M 4/9033 |

OTHER PUBLICATIONS

Wang et al., "Design and characterization of apatite La9.8Si5.7Mg0. 3O26+/-σ-based micro-tubular solid oxide fuel cells," Journal of Power Sources 460 (2020), 9 pages.
Yoshioka et al., "Fabrication of apatite-type lanthanum silicate films and anode supported solid oxide fuel cells using nano-sized printable paste," Journal of the European Ceramic Society 34 (2014) pp. 373-379, 7 pages.
Yoshioka et al., "Ionic conductivity and fuel cell properties of apatite-type lanthanum silicates doped with Mg and containing excess oxide ions," Solid State Ionics 179 (2008) pp. 2165-2169, 5 pages.
Nakayama et al., "Ionic Conductivity of Lanthanoid Silicates, Ln,, (SiO,)GO, (Ln = La, Nd, Sm, Gd, Dy, Y, Ho, Er and Yb)" J. Mater. Chem., 1995, 5(II), pp. 1801-1805, 6 pages.
Jie Tian, "Fabrication of La10Si5.8Mg0.2O26.8 electrolyte films and their anode functional layers," 2017, Dalian University of Technology, 63 pages.
Su et al., "Progress in low-temperature solid oxide fuel cells with hydrocarbon fuels," Chemical Engineering Journal 402 (2020) 20 pages.
Liu et al., "Solid oxide fuel cells with apatite-type lanthanum silicate-based electrolyte films deposited by radio frequency magnetron sputtering," Journal of Power Sources 381 (2018) pp. 101-106, 6 pages.
Gasparyan et al., "Synthesis and characterization of doped apatite-type lanthanum silicates for SOFC applications," Solid State Ionics 192 (2011) pp. 158-162, 5 pages.
Li Sen, "Fabrication of Anode Functional Layer and Thin Film Electrolyte for Low-Intermediate Temperature Solid Oxide Fuel Cells," 2019, Dalian University of Technology, 68 pages.
Dong Yue, "Fabrication of Anode Functional Layer and Electrolyte for Apatite Lanthanum Silicate SOFCs," 2018, Dalian University of Technology, 61 pages.

* cited by examiner

METHOD FOR PREPARING A SUBMICRO/NANO-POROUS NIO/APATITE-TYPE LANTHANUM SILICATE ANODE FUNCTIONAL LAYER

FIELD OF THE TECHNIQUE

This invention belongs to the field of solid oxide fuel cells. This invention relates to a method for preparing a submicro/nano-porous anode functional layer, and particularly relates to a method for preparing a submicro/nano-porous NiO/apatite-type lanthanum silicate anode functional layer, in which the apatite-type lanthanum silicate includes various doped apatite-type lanthanum silicates.

BACKGROUND OF THE TECHNIQUE

Solid oxide fuel cells (SOFCs) are a kind of electrochemical device with an all-solid structure, which can directly convert the chemical energy in fuels into electrical energy through electrochemical reactions. SOFCs have a high fuel utilization rate, are clean to the environment and have a prospect of widespread applications.

Solid oxide fuel cells are composed mainly of a porous anode, a porous cathode and a dense electrolyte. The conventional SOFCs operate at a temperature above 800° C. The high operating temperature leads to high systems cost and degradation rates, and slow start-up and thermal cycling (Hanrui Su, Yun Hang Hu. Progress in low-temperature solid oxide fuel cells with hydrocarbon fuels [J]. Chemical Engineering Journal, 2020, 402, 126235.). Reducing the operating temperature of SOFCs has become a key to their commercial applications. In order to realize the SOFC operation at low-intermediate temperatures and reduce the operating temperature to 500° C.-700° C., two following technical routes are mainly adopted at present. One is to develop new materials with high ionic conductivity at low temperatures, and the other is to reduce thickness of the electrolyte as much as possible.

Apatite-type lanthanum silicate is a new type of oxide ionic conductor first discovered by Nakayama et al. in 1995. The apatite-type lanthanum silicate has higher oxide ionic conductivity and low activation energy at low-intermediate temperatures. The oxide ionic conductivities are $1.8 \times 10^{-4}$ $Scm^{-1}$ at 500° C. and $1.4 \times 10^{-3}$ $Scm^{-1}$ at 700° C. respectively, and the activation energy is 69 $kJmol^{-1}$ (Susumu Nakayama, Tatsuya Kageyama, Hiromichi Aono. Yoshihiko Sadaoka. Tonic conductivity of lanthanoid silicates, $Ln_{10}$ $(SiO_4)O_3$(Ln=La, Nd, Sm, Gd, Dy, Y, Ho, Er and Yb)[J]. Journal of Materials Chemistry, 1995, 5(11), 1801-1805.). Thereafter, the oxide ionic conductivity of the apatite-type lanthanum silicate has been increased through doping (H. Gasparyan, S. Neophytides, D. Niakolas, V. Stathopoulos, T Kharlamova, V Sadykov, O. Van der Biest, F. Jothinathan, F. Louradour, J. P. Joulin, S. Bebelis. Synthesis and characterization of doped apatite-type lanthanum silicates for SOFC applications[J]. Solid State Tonics, 2011, 192, 1_58162(1); Tianrang Yang, Hailei Zhao, Mengya Fang, Konrad Swierczek, Jie Wang, Zhihiong Du. A New Family of Cu-doped Lanthanum Silicate Apatites as Electrolyte Materials for SOFCs: Synthesis, Structural and Electrical Properties[J]. Journal of the European Ceramic Society, 2019, 39, 424-431(2).). At present, the apatite-type Mg doped lanthanum silicates (Mg doped Lanthanum Silicate, MDLS) fabricated by Yoshioka et al. exhibit the highest level of oxide ionic conductivities and a low level of activation energy: $La_{10}Si_{5.8}Mg_{0.2}O_{26.8}$ with the oxide ionic conductivities of $14 \times 10^{-3}$ $Scm^{-1}$ at 500° C. and $51 \times 10^{-3}$ $Scm^{-1}$ at 700° C. respectively, and the activation energy of 0.43 eV; $La_{9.8}Si_{5.7}Mg_{0.3}O_{26.4}$ with the oxide ionic conductivities of $12 \times 10^{-3}$ $Scm^{-1}$ at 500° C. and $43 \times 10^{-3}$ $Scm^{-1}$ at 700° C. respectively, and the activation energy of 0.42 eV (Hideki Yoshioka, Yoshihiro Nojiri, Shigeo Tanase. Ionic conductivity and fuel cell properties of apatite-type lanthanum silicates doped with Mg and containing excess oxide ions[J]. Solid State Ionics, 2008, 179, 2165-2169.). In comparison with the conventional oxide ionic conductor yttria-stabilized zirconia (YSZ), the apatite-type Mg doped lanthanum silicates have higher oxide ionic conductivity at low-intermediate temperatures and lower activation energy. The apatite-type Mg doped lanthanum silicates are the most preferred oxide ionic conductor materials for achieving the SOFC operation at low-intermediate temperatures.

As mentioned above, a thin film electrolyte must be used in order to achieve the SOFC operation at low-intermediate temperatures. An anode supported structure is employed for the SOFCs using a thin film electrolyte, in which an electrolyte thin film and a cathode are supported by an anode substrate and the thickness of the electrolyte thin film is several microns. However, most of the currently fabricated apatite-type lanthanum silicate SOFCs use a microporous anode substrate, on which the thickness of the electrolyte is mostly above 10 μm. Yoshioka et al. prepared a $La_{9.8}Si_{5.7}Mg_{0.3}O_{26.4}$ electrolyte thin film with a thickness of 15 μm on a microporous $NiO/La_{9.8}Si_{5.7}Mg_{0.3}O_{26.4}$ anode substrate by spin coating, and fabricated a full SOFC which has a maximum power density of 51 $mWcm^{-2}$ at 700° C. (Hideki Yoshioka, Hirovuki Mieda, Takahiro Funahashi, Atsushi Mineshige, Tetsuo Yazawa, Ryohei Mori. Fabrication of apatite-type lanthanum silicate films and anode supported solid oxide fuel cells using nano-sized printable paste[J]. Journal of the European Ceramic Society, 2014, 34, 373-379.). Wang et al. prepared anode supported micro-tubular solid oxide fuel cells. A microporous NiO/LSMO composite anode substrate was employed, on whose surface a $La_{9.8}Si_{5.7}Mg_{0.3}O_{26+\delta}$ (LSMO) electrolyte thin film with a thickness of 12 μm was prepared through dip-coating processes. The micro-tubular solid oxide fuel cell shows a power density of 44 $mWcm^{-2}$ at 700° C. (Sea-Fue Wang, Yung-Fu Hsu, Pu Hsia, Wei-Kai Hung, Piotr Jasinski. Design and characterization of apatite $La_{9.8}Si_{5.7}Mg_{0.3}$ $O_{26+\delta}$-based micro-tubular solid oxide fuel cells[J]. Journal of Power Sources, 2020, 460, 228072.). Liu et al. prepared a MDLS electrolyte thin film with a 2.8 μm thickness on a submicroporous $NiO/Sm_{0.2}CeO_{8-\delta}$ (SDC) anode substrate by radio frequency magnetron sputtering. And a cathode was fabricated on the electrolyte thin film to complete a full SOFC. The SOFC exhibits a maximum power density of 212 $mWcm^{-2}$ at 700° C. (Yi-Xin Liu, Sea-Fue Wang, Yung-Fu Hsu Chi-Hua Wang, Solid oxide fuel cells with apatite-type lanthanum silicate-based electrolyte films deposited by radio frequency magnetron sputtering[J]. Journal of Power Sources, 2018, 381, 101-106). However, the porosity of the anode substrate is rather low because Liu et al. fabricated the anode substrate by tape casting. Moreover, the same MDLS oxide ionic conductor as the electrolyte is not used for the anode substrate, which will cause an increasing of the resistance at the anode/electrolyte interface.

Anodes of solid oxide fuel cells are porous anodes with a porosity of 30%-40% and pore sizes great than 1 μm. However, a dense electrolyte thin film with the thickness of a few microns cannot be fabricated on a microporous anode substrate, because a thin film cannot totally cover the pores on a substrate surface to form a dense thin film, when the thickness of the thin film is smaller than or equal to the pore sizes on the substrate. In order to fabricate a dense electrolyte thin film of a few microns in thickness, a functional layer, i.e. an anode functional layer, must be added between the microporous anode substrate and the electrolyte thin film. And it is required that the size of large pores in the functional layer is restricted in a submicrometer range and the surface of the functional layer is even. Moreover, because the crystal grains and pores are much finer in the anode functional layer, the number of triple phase boundaries will be increased greatly. As a result, the anode polarization losses will be decreased and the SOFC power density will be increased.

Currently, there are few studies on porous NiO/apatite-type lanthanum silicate anode functional layers. Dongyue prepared a porous NiO/apatite-type lanthanum silicate anode functional layer on a microporous NiO/apatite-type lanthanum silicate anode substrate through screen printing. But there are pores with larger sizes in the anode functional layer. The maximum pore size is 2 μm and there are few nano-sized pores (Dongyue, Fabrication of Anode Functional Layer and Electrolyte for Apatite Lanthanum Silicate SOFCs [Master Degree Thesis], Dalian University of Technology, 2018.). Based on Dongyue's studies, Lisen fabricated an anode functional layer with the maximum deep pore size of 1 μm and a large number of nano-sized small pores through optimizing the heat treatment process for the anode functional layer. However, the anode functional layer contains microcracks (Lisen, Fabrication of Anode Functional Layer and Thin Film Electrolyte for Low-Intermediate Temperature Solid Oxide Fuel Cells [Master Degree Thesis], Dalian University of Technology, 2019.). It can be seen that the porous NiO/apatite-type lanthanum silicate anode functional layers prepared so far are all not ideal. Therefore, in order to achieve the SOFC operation at low-intermediate temperatures, it is urgent to develop a new process to fabricate a NiO/apatite-type lanthanum silicate anode functional layer with pore sizes less than 1 μm and no cracks on a microporous NiO/apatite-type lanthanum silicate anode substrate.

CONTENTS OF THE INVENTION

The purpose of this invention is to provide a method for preparing a submicro/nano-porous NiO/apatite-type lanthanum silicate anode functional layer to fabricate a porous anode functional layer with an even surface, no cracks and large pore sizes in submicrometers, on which a dense solid electrolyte thin film can be prepared, in order to solve the problem that it is difficult to fabricate a thin and dense film electrolyte on a microporous anode substrate through magnetron sputtering. In addition, through reducing the pore sizes the triple phase reaction boundaries are increased so as to improve the SOFC power density.

To overcome the problems such as relative larger pore sizes and cracks in the current NiO/apatite-type lanthanum silicate anode functional layer, this invention adopts a functional layer nanopowder, ethyl cellulose as a binder and terpineol as a solvent. These ingredients are mixed and anhydrous ethanol is added. The mixture is dispersed ultrasonically so that each ingredient is dispersed homogeneously to obtain a suspension of a functional layer paste. A rotary evaporator is utilized to remove the anhydrous ethanol in the suspension of the functional layer paste through evaporation to obtain a viscous paste. Then the viscous paste is taken out and is ground to fully guarantee a homogeneous distribution of each component in the functional layer paste, and to complete the preparation of a functional layer paste. Screen printing is used to prepare an anode functional layer on a microporous NiO/apatite-type lanthanum silicate anode substrate. Optimal heat treatment parameters are developed. The heating process is strictly controlled. The decompose rate of organic matters in the anode functional layer in the heating process is reduced to avoid the production of cracks in the anode functional layer in the heating process in order to prepare the submicro/nano-porous NiO/apatite-type lanthanum silicate anode functional layer which meets the requirements. NiO in the prepared anode functional layer will be reduced to Ni in $H_2$ atmosphere during use.

The technical scheme adopted in this invention is as follows. A functional layer nanopowder, ethyl cellulose, terpineol are used. They are added into a rotary evaporation bottle containing anhydrous ethanol according to a certain proportion and order. A suspension of a functional layer paste formed after mixing is dispersed ultrasonically. The anhydrous ethanol in the suspension of the functional layer paste is removed by a rotary evaporator. The rotary evaporation bottle is taken down when the suspension of the functional layer paste becomes a viscous paste. The viscous paste is scraped into a mortar and is ground to complete the preparation of a functional layer paste. The functional layer paste prepared is applied onto a microporous NiO/apatite-type lanthanum silicate anode substrate by a screen printing method, and 3 sublayers are screen printed. After dried, the sublayers are heat treated and sintered correspondingly. The heating rates, cooling rates and holding times are controlled strictly in the heating and cooling processes to complete the preparation of a submicro/nano-porous NiO/apatite-type lanthanum silicate anode functional layer. The steps to realize the technical scheme are as follows:

step 1: to prepare a functional layer nanopowder, weighing an apatite-type lanthanum silicate nanopowder and a NiO nanopowder proportionally; adding anhydrous ethanol into a ball milling jar, putting the weighed apatite-type lanthanum silicate nanopowder and NiO nanopowder into the ball milling jar, and mixing by ball milling to obtain a suspension; specifically, the materials of the ball milling jar and the milling beads are agate;

step 2: pouring the suspension obtained after mixing by ball milling in step 1) into a container, putting the container into a constant temperature drying oven, and cooling the suspension naturally after drying treatment at a temperature of 55° C. to obtain a ball milled mixture;

step 3: putting the ball milled mixture obtained after drying treatment in step 2) in a mortar and grinding the mixture to obtain the functional layer nanopowder; specifically, the material of the mortar is agate;

step 4: weighing and measuring the functional layer nanopowder obtained in step 3), ethyl cellulose and terpineol proportionally; adding the terpineol into a rotary evaporation bottle containing anhydrous ethanol, and dispersing the terpineol ultrasonically to make the terpineol dispersed homogenously in the anhydrous ethanol and obtain a mixed solution;

step 5: grinding the functional layer nanopowder and the ethyl cellulose weighed in step 4), mixing uniformly, then adding the mixed powder into the mixed solution obtained in step 4), and dispersing the mixed powder ultrasonically to obtain a suspension of a functional layer paste;

step 6: fixing the rotary evaporation bottle to a rotary evaporator, removing the anhydrous ethanol in the suspension of the functional layer paste obtained in step
5) by rotary evaporation until the suspension of the
functional layer paste in the rotary evaporation bottle
becomes a viscous paste;

step 7: taking out the paste in the rotary evaporation bottle
obtained in step 6), putting the paste in the mortar, and
grinding the paste in water bath condition to complete
the preparation of the functional layer paste;

step 8: using a squeegee to apply the functional layer paste
obtained in step 7) uniformly onto an anode substrate
by a screen printing method, then putting a first
sublayer of an anode functional layer prepared into the
constant temperature drying oven for drying, and tak-
ing out the first sublayer of the anode functional layer
after drying;

step 9: repeating step 8) to prepare a second sublayer of
the anode functional layer and a third sublayer of the
anode functional layer;

step 10: placing the anode functional layer prepared in
step 9) into an $Al_2O_3$ crucible, and putting the crucible
into a high temperature box-type furnace for heat
treatment and sintering to obtain a submicro/nano-
porous NiO/apatite-type lanthanum silicate anode func-
tional layer.

In an embodiment, in step 1), particle sizes of the apatite-
type lanthanum silicate nanopowder are of 50-100 nm, and
the NiO nanopowder is a commercially available NiO
nanopowder with particle sizes of 20-70 nm.

In an embodiment, in step 1), the apatite-type lanthanum
silicate nanopowder and the NiO nanopowder are added into
a ball milling jar containing anhydrous ethanol and are
mixed by ball milling, and the mixing time is 18-22 h.

In an embodiment, in step 4), the mass ratio of the
functional layer nanopowder to the terpineol is 5:5-7:3, and
the ethyl cellulose accounts for 10%-14% of the total mass
of the mixture of the functional layer nanopowder, the
terpineol and the ethyl cellulose.

In an embodiment, in step 6), the anhydrous ethanol in the
suspension of the functional layer paste is removed by a
rotary evaporator, and the parameters of the rotary evapo-
rator are set as follows: the rotation speed is 50-100 r/min,
the water bath temperature is 30-50° C., the vacuum is
0.05-0.098 MPa, and the rotary evaporation time is 0.5-4 h.

In an embodiment, in step 7), the grinding is carried out
in 35° C. water bath condition for 10-30 min to complete the
preparation of the functional layer paste.

In an embodiment, in step 8), 30 nm NiO is used for the
anode substrate which is fabricated according to the China
invention patent CN201310357158.X which is incorporated
herein in its entirety through the citation.

In an embodiment, in step 8), a screen printing plate with
a mesh number of 300 is used in the screen printing method.

In an embodiment, in step 8), the anode functional layer
is put into the constant temperature drying oven for drying,
and the drying temperature is 50° C.-70° C.

In an embodiment, in step 10), the sintering temperature
of the anode functional layer is 1000° C.-1200° C. In order
to prevent the gas produced during decomposition of the
organic matters from enlarging the pore sizes on the surface
of the anode functional layer and to prevent the formation of
microcracks due to high thermal stresses induced in the
heating and cooling processes for sintering, the temperature
must be increased and decreased slowly in the heat treatment
and in the sintering, and the holding times for temperature
must be reasonably controlled. The anode functional layer is
heated at a heating rate of 1-2° C./min from room tempera-
ture to 260° C., in which temperature range, 2° C. is taken as a step and the temperature is held for 5 min in each step;
In a temperature range of 260° C.-288° C., the heating rate
is 1-2° C./min, 10° C. is taken as a step and the temperature
is held for 20 min in each step, and at 288° C. the tempera-
ture is held for 20 min; In a temperature range of 288°
C.-550° C., the heating rate is 1-2° C./min, 2° C. is taken as
a step and the temperature is held for 10 min in each step;
The anode functional layer is heated at a heating rate of 1-2°
C./min from 550° C. to 100° C.-1200° C. and is sintered for
2 h; Then the anode functional layer is cooled at a cooling
rate of 1-2° C./min to 600° C., and thereafter the anode
functional layer is cooled with the furnace to room tempera-
ture.

This invention can be used for the fabrication of a
submicro/nano-porous NiO/apatite-type lanthanum silicate
anode functional layer, in which the apatite-type lanthanum
silicate includes the apatite-type lanthanum silicates doped
with various elements, in order to fabricate an anode func-
tional layer whose ionic conductor is the same material as
the electrolyte.

The beneficial effects of this invention are as follows: the
fabricated submicro/nano-porous NiO/apatite-type lantha-
num silicate anode functional layer has the maximum pore
size of less than 1 μm and an even surface without cracks,
and the anode functional layer provides a substrate on which
a thin and dense electrolyte film can be prepared by mag-
netron sputtering in order to achieve the thinning of the
electrolyte; the anode functional layer contains a large
number of nanopores which increase greatly triple phase
reaction boundaries. Therefore, a foundation is laid for
achieving the SOFC operation at low-intermediate tempera-
tures.

DESCRIPTION OF THE ACCOMPANYING DRAWINGS

DETAILED DESCRIPTION

Figure 1:
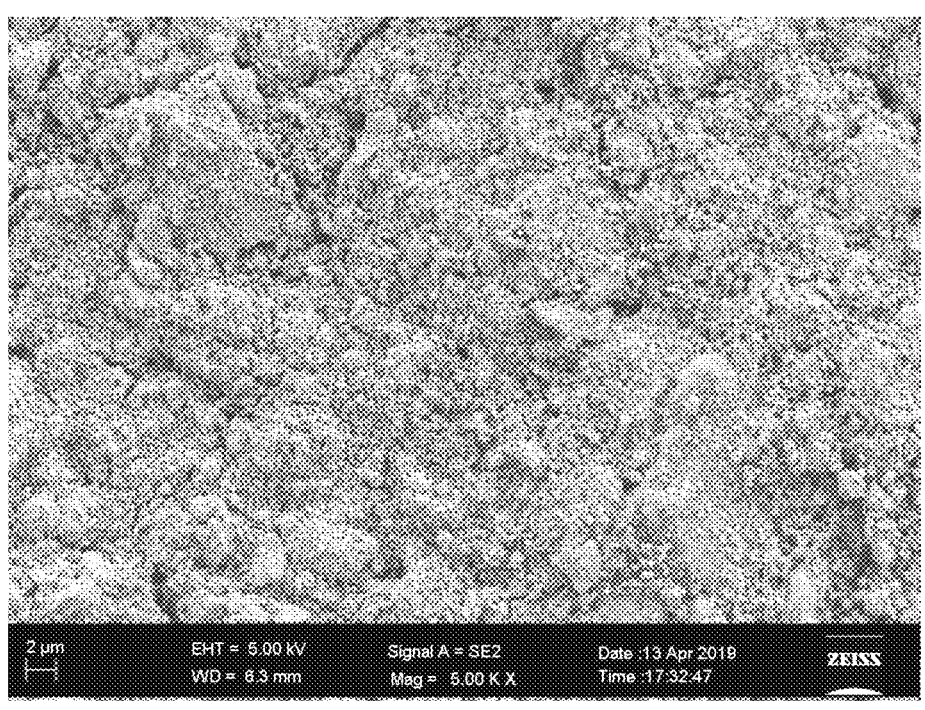
FIG. 1 is a FE-SEM micrograph of a surface of an anode
functional layer in the comparative embodiment.

In combination with the accompanying drawings, this
invention is further illustrated with an embodiment below.
But the illustration is not as a limitation to this invention.
Specific materials used in the embodiment of this invention
and their sources are provided below. However, it ought to
be understood that these are merely exemplary and are not
intend to limit this invention, and materials which are the
same as or similar to the following reagents and instruments
in types, models, qualities, properties or functions can be all
used to implement this invention. The experimental methods used in the embodiment described below are all conventional methods unless otherwise specified. The materials, reagents, etc. used in the embodiment described below can be all obtained from commercial sources unless otherwise specified.

EMBODIMENT

Preparing a Submicro/Nano-Porous NiO/Apatite-Type Lanthanum Silicate Anode Functional Layer In this embodiment, a preparation of a submicro/nano-porous NiO/apatite-type lanthanum silicate anode functional layer includes the following steps:

the first step: to prepare a functional layer powder, an 80 nm apatite-type lanthanum silicate ($La_{10}Si_{5.7}Mg_{0.2}O_{26.8}$) nanopowder and a 30 nm NiO nanopowder are weighed according to the mass ratio of 4:6, and herein, the $La_{10}Si_{5.7}Mg_{0.2}O_{26.8}$ nanopowder is prepared according to the China invention patent CN201310357158.X; anhydrous ethanol is added into a ball milling jar, and the weighed apatite-type lanthanum silicate nanopowder and NiO nanopowder are put into the jar and mixed by ball milling to obtain a suspension; specifically, the materials of the ball milling jar and the milling beads are agate;

the second step: the suspension obtained after mixing by the ball milling is poured into a container and the container is put in a constant temperature drying oven, and after a drying treatment at 55° C. for 24 h, the suspension is cooled naturally to obtain a ball milled mixture;

the third step: the ball milled mixture obtained after the drying treatment is put in a mortar and is ground for 1 h to obtain a functional layer nanopowder; specifically, the material of the mortar is agate;

the fourth step: according to the mass ratio of 6:4 for functional layer nanopowder to terpineol, 1.5 g of the functional layer nanopowder is weighed and 1.0753 ml of terpineol is measured; according to ethyl cellulose accounting for 12.5% of the total mass of the mixture of the functional layer nanopowder, the terpineol and the ethyl cellulose, 0.3571 g of ethyl cellulose is weighed; the terpineol is added into a rotary evaporation bottle containing 30 ml of anhydrous ethanol, and is dispersed ultrasonically for 10 min to enable the terpineol dispersed homogenously in the anhydrous ethanol to obtain a mixed solution; the terpineol and the ethyl cellulose are all analytically pure reagents;

the fifth step: the weighed 1.5 g of the functional layer nanopowder and the 0.3571 g of the ethyl cellulose are put in the mortar and are ground for 20 min to enable them mixed uniformly; then the mixed powder is added to the mixed solution obtained in the fourth step and is dispersed ultrasonically further for 20 min to obtain a suspension of a functional layer paste;

the sixth step: the rotary evaporation bottle is fixed to a rotary evaporator to remove the anhydrous ethanol in the suspension of the functional layer paste through rotary evaporation, and the rotary evaporation time is 30 min; after the anhydrous ethanol is removed, the suspension of the functional layer paste becomes a viscous paste; the parameters of the rotary evaporator are set as follows: the rotation speed is 90 r/min, the water bath temperature is 45° C., and the vacuum is 0.098 MPa; the seventh step: the viscous paste in the rotary evaporation bottle is taken out and is put in the mortar, and the viscous paste is ground for 20 min at a water bath temperature of 35° C. to complete the preparation of the functional layer paste;

the eighth step: a screen printing plate with a mesh number of 300 is used, and the functional layer paste obtained in the seventh step is applied uniformly onto a microporous $NiO/La_{10}Si_{5.7}Mg_{0.2}O_{26.8}$ anode substrate by screen printing with a squeegee to obtain a first sublayer of an anode functional layer; then the first sublayer of the anode functional layer prepared is put into the constant temperature drying oven with a temperature of 70° C. for drying, and the drying time is 10 min; after drying, the first sublayer of the anode functional layer is taken out;

the ninth step: a second sublayer of the anode functional layer and a third sublayer of the anode functional layer are prepared by repeating the eighth step;

the tenth step: the anode functional layer prepared in the ninth step is placed in an $Al_2O_3$ crucible, and the crucible is put into a high temperature box-type furnace for heat treatment and sintering; parameters for the heat treatment and sintering are set as follows: the anode functional layer is heated at a heating rate of 2° C./min from room temperature to 260° C., in which temperature range, 2° C. is taken as a step and the temperature is held for 5 min in each step; in a temperature range of 260° C.-288° C., the heating rate is 2° C./min, 10° C. is taken as a step and the temperature is held for 20 min in each step, and at 288° C. the temperature is held for 20 min; in a temperature range of 288° C.-550° C., the heating rate is 2° C./min, 2° C. is taken as a step and the temperature is held for 10 min in each step; the anode functional layer is heated at a heating rate of 2° C./min from 550° C. to 1050° C. and is sintered for 2 h; then the anode functional layer is cooled at a cooling rate of 2° C./min to 600° C., and thereafter the anode functional layer is cooled with the furnace to room temperature.

Figure 2:
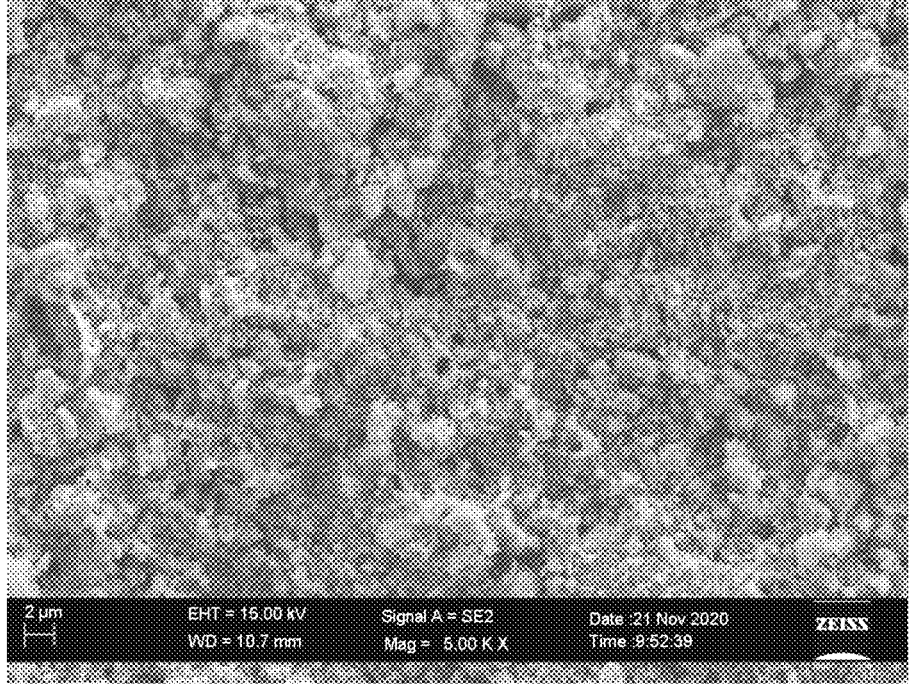
FIG. 2 is a FE-SEM micrograph of a surface of an anode
functional layer prepared by using the method for preparing
a submicro/nano-porous NiO/apatite-type lanthanum sili-
cate anode functional layer provided in the embodiment of
this invention.
Figure 3:
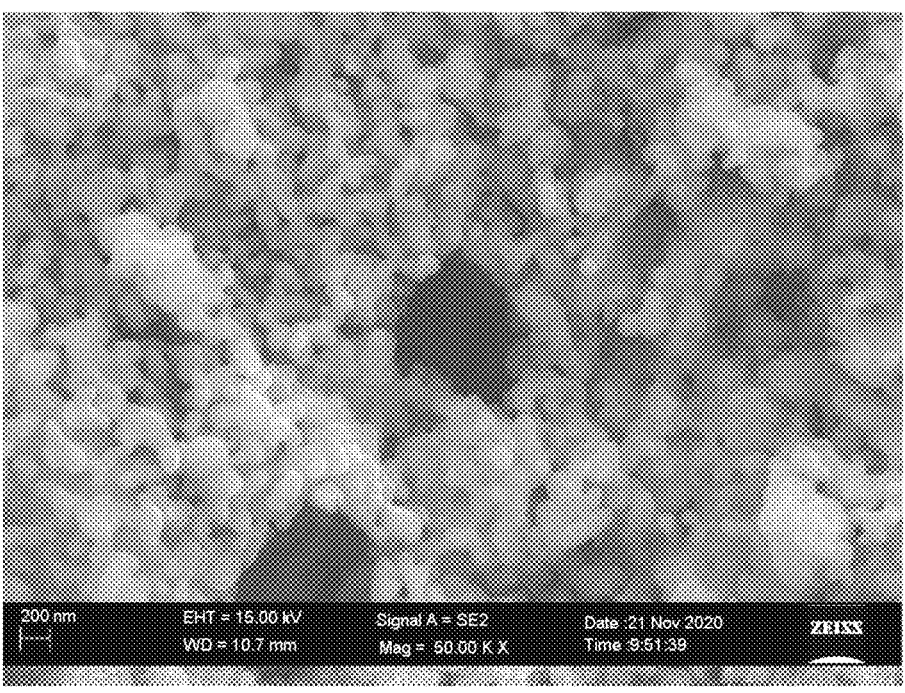
FIG. 3 is a FE-SEM micrograph of the surface of the
anode functional layer prepared by using the method for
preparing a submicro/nano-porous NiO/apatite-type lantha-
num silicate anode functional layer provided in the embodi-
ment of this invention, and is a highly magnified micrograph
of the middle part in FIG. 2.
Figure 4:
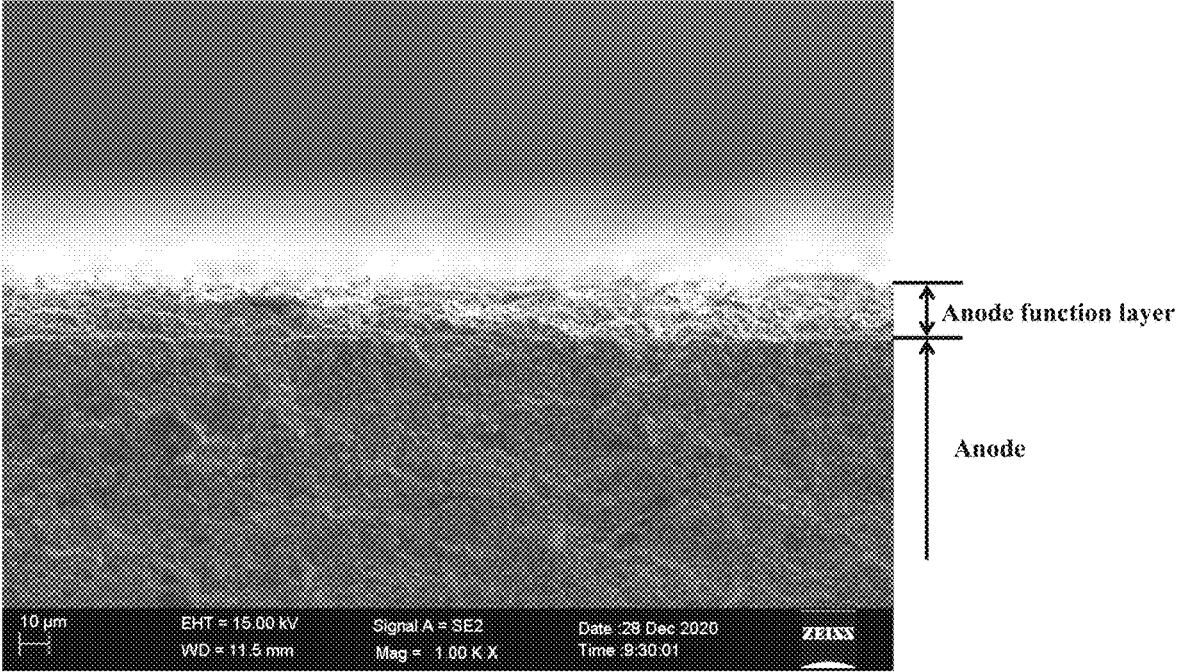
FIG. 4 is a FE-SEM micrograph of a cross section of the
anode functional layer prepared by using the method for
preparing a submicro/nano-porous NiO/apatite-type lantha-
num silicate anode functional layer provided in the embodi-
ment of this invention.

FIG. 2 is a FE-SEM micrograph of a surface of an anode functional layer prepared by using the method for preparing a submicro/nano-porous NiO/apatite-type lanthanum silicate anode functional layer, which is provided in the embodiment of this invention. FIG. 3 is a highly magnified micrograph of the middle part in FIG. 2. FIG. 4 is a FE-SEM micrograph of a cross section of the anode functional layer prepared by using the method for preparing a submicro/nano-porous NiO/apatite-type lanthanum silicate anode functional layer, which is provided in the embodiment of this invention. Referring to FIGS. 2 to 4, the submicro/nano-porous NiO/apatite-type lanthanum silicate anode functional layer prepared by using the method provided in the embodiment of this invention is examined. The anode functional layer has the maximum pore size of less than 1 μm, an even surface without cracks. The thickness of the anode functional layer is 13.5 μm. The anode functional layer provides a substrate on which a thin and dense electrolyte film can be prepared by RF magnetron sputtering. Moreover, referring to FIG. 3, the submicro/nano-porous functional layer prepared by using the method provided in the embodiment contains a large number of nano-sized pores. In comparison with the anode substrate, the crystal grains in the anode functional layer are also much finer, which results in greatly increasing of the number of triple phase boundaries for reactions. Therefore, polarization losses in the anode can be reduced and the power density of SOFCs can be increased.

COMPARATIVE EXAMPLE

An anode functional layer fabricated by using a method mentioned by Lisen (Lisen, Fabrication of Anode Functional Layer and Thin Film Electrolyte for Low-Intermediate Temperature Solid Oxide Fuel Cells [Master Degree Thesis]. Dalian University of Technology, 2019) is adopted as a comparative example. FIG. 1 is a FE-SEM micrograph of a surface of the anode functional layer of the comparative example. Referring to FIG. 1, deep pores in the anode functional layer obtained in the comparative example have relative larger sizes and there are cracks on the surface. Moreover, the surface evenness of the anode functional layer is poorer.

The description presented in the foregoing exemplary embodiment is used only to illustrate the technical scheme of this invention, and is not intended to be exhaustive, and nor is intended to limit this invention to the precise form described. Obviously, it is possible for those of ordinary skill in the art to make many changes and variations in light of the foregoing teachings. The exemplary embodiment is chosen and described in order to explain the specific principles of this invention and their practical applications so as to facilitate the others skilled in the art to understand, implement and utilize the exemplary embodiment of this invention as well as various elective forms and modified forms thereof. The scope of protection of this invention is intended to be defined by the accompanying claims and their equivalents.

The invention claimed is:

1. A method for preparing a submicro/nano-porous NiO/apatite-type lanthanum silicate anode functional layer, comprising the following steps:

step 1: to prepare a functional layer nanopowder, weighing an apatite-type lanthanum silicate nanopowder and a NiO nanopowder proportionally; adding anhydrous ethanol into a ball milling jar, putting the weighed apatite-type lanthanum silicate nanopowder and NiO nanopowder into the ball milling jar, and mixing by ball milling to obtain a suspension;

step 2: pouring the suspension obtained after mixing by ball milling in step 1) into a container, putting the container into a constant temperature drying oven, and cooling the suspension naturally after drying treatment to obtain a ball milled mixture;

step 3: putting the ball milled mixture obtained after drying treatment in step 2) in a mortar and grinding the mixture to obtain the functional layer nanopowder;

step 4: weighing and measuring the functional layer nanopowder obtained in step 3), ethyl cellulose and terpineol proportionally; adding the terpineol into a rotary evaporation bottle containing anhydrous ethanol, and dispersing the terpineol ultrasonically to make the terpineol dispersed homogenously in the anhydrous ethanol and obtain a mixed solution;

step 5: grinding the functional layer nanopowder and the ethyl cellulose weighed in step 4), mixing uniformly, then adding the mixed powder into the mixed solution obtained in step 4), and dispersing the mixed powder ultrasonically to obtain a suspension of a functional layer paste;

step 6: fixing the rotary evaporation bottle to a rotary evaporator, removing the anhydrous ethanol in the suspension of the functional layer paste obtained in step 5) by rotary evaporation until the suspension of the functional layer paste in the rotary evaporation bottle becomes a viscous paste;

step 7: taking out the paste in the rotary evaporation bottle obtained in step 6), putting the paste in the mortar, and grinding the paste in water bath condition to complete the preparation of the functional layer paste;

step 8: using a squeegee to apply the functional layer paste obtained in step 7) uniformly onto an anode substrate by a screen printing method, then putting a first sublayer of an anode functional layer prepared into the constant temperature drying oven for drying, and taking out the first sublayer of the anode functional layer after drying;

step 9: repeating step 8) to prepare a second sublayer of the anode functional layer and a third sublayer of the anode functional layer;

step 10: placing the anode functional layer prepared in step 9) into an $Al_2O_3$ crucible, and putting the crucible into a high temperature box-type furnace for heat treatment and sintering to obtain a submicro/nano-porous NiO/apatite-type lanthanum silicate anode functional layer.

2. The method for preparing a submicro/nano-porous NiO/apatite-type lanthanum silicate anode functional layer according to claim 1, wherein in step 10), the heat treatment and sintering comprise the following steps:

a) heating the anode functional layer at a heating rate of 1-2° C./min from room temperature to 260° C., in which temperature range, taking 2° C. as a step to hold temperature for 5 min in each step;

b) in a temperature range of 260° C.-288° C. and at a heating rate of 1-2° C./min, taking 10° C. as a step to hold temperature for 20 min in each step, and at 288° C. holding temperature for 20 min;

c) in a temperature range of 288° C.-550° C. and at a heating rate of 1-2° C./min, taking 2° C. as a step to hold temperature for 10 min in each step;

d) heating the anode functional layer at a heating rate of 1-2° C./min from 550° C. to 1000° C.-1200° C., and sintering for 2 h;

e) cooling the anode functional layer at a cooling rate of 1-2° C./min to 600° C., and then cooling the anode functional layer together with the furnace to room temperature.

3. The method for preparing a submicro/nano-porous NiO/apatite-type lanthanum silicate anode functional layer according to claim 1, wherein in step 4), the mass ratio of the functional layer nanopowder to the terpineol is 5:5-7:3, and the ethyl cellulose accounts for 10%-14% of the total mass of the mixture of the functional layer nanopowder, the terpineol and the ethyl cellulose.

4. The method for preparing a submicro/nano-porous NiO/apatite-type lanthanum silicate anode functional layer according to claim 1, wherein in step 6), the parameters of the rotary evaporator are set as follows: the rotation speed is 50-100 r/min, the water bath temperature is 30-50° C., the vacuum is 0.05-0.098 MPa, and the rotary evaporation time is 0.5-4 h.

5. The method for preparing a submicro/nano-porous NiO/apatite-type lanthanum silicate anode functional layer according to claim 3, wherein in step 6), the parameters of the rotary evaporator are set as follows: the rotation speed is 50-100 r/min, the water bath temperature is 30-50° C., the vacuum is 0.05-0.098 MPa, and the rotary evaporation time is 0.5-4 h.

6. The method for preparing a submicro/nano-porous NiO/apatite-type lanthanum silicate anode functional layer according to claim 1, wherein in step 7), the grinding is carried out in 35° C. water bath condition for 10-30 min to complete the preparation of the functional layer paste.

7. The method for preparing a submicro/nano-porous NiO/apatite-type lanthanum silicate anode functional layer according to claim 3, wherein in step 7), the grinding is carried out in 35° C. water bath condition for 10-30 min to complete the preparation of the functional layer paste.

8. The method for preparing a submicro/nano-porous NiO/apatite-type lanthanum silicate anode functional layer according to claim 4, wherein in step 7), the grinding is carried out in 35° C. water bath condition for 10-30 min to complete the preparation of the functional layer paste.

9. The method for preparing a submicro/nano-porous NiO/apatite-type lanthanum silicate anode functional layer according to claim 1, wherein in step 1), the particle sizes of the apatite-type lanthanum silicate nanopowder are 50-100 nm, and the particle sizes of the NiO nanopowder are 20-70 nm;

in step 8), the anode substrate is prepared with a 30 nm NiO powder; and the drying temperature is 50° C.-70° C.

10. The method for preparing a submicro/nano-porous NiO/apatite-type lanthanum silicate anode functional layer according to claim 4, wherein in step 1), the particle sizes of the apatite-type lanthanum silicate nanopowder are 50-100 nm, and the particle sizes of the NiO nanopowder are 20-70 nm;

in step 8), the anode substrate is prepared with a 30 nm NiO powder; and the drying temperature is 50° C.-70° C.

\* \* \* \* \*